Aug. 16, 1949.　　　　　I. MOORE　　　　　2,479,129
UNIVERSAL JOINT
Filed March 27, 1946
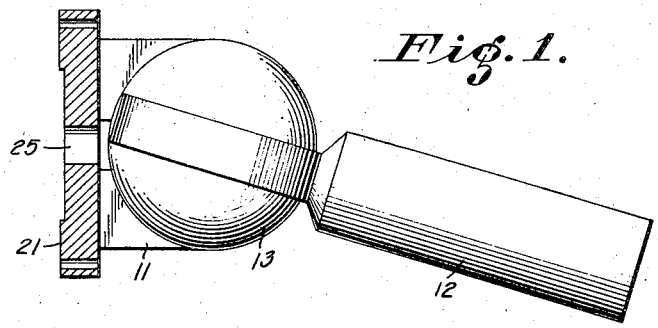
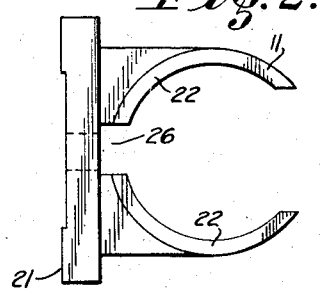
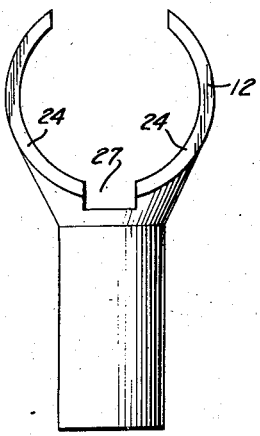
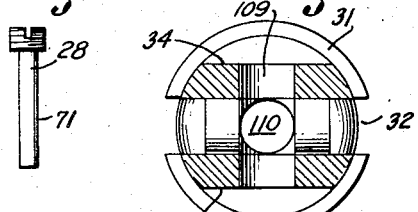
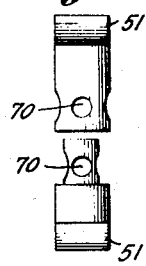
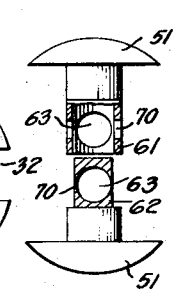
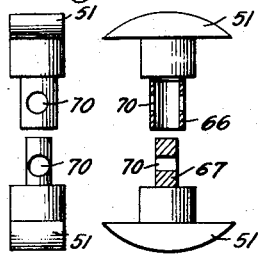
Inventor.
Irving Moore Patented Aug. 16, 1949

2,479,129

UNITED STATES PATENT OFFICE 2,479,129

UNIVERSAL JOINT

Irving Moore, Scotch Plains, N. J.

Application March 27, 1946, Serial No. 657,557

3 Claims. (Cl. 64—16)

My invention relates to universal joints, more particularly to the kind in which an intermediate ball member is formed with circumferential grooves of substantially rectangular cross-section in planes which are at right angles to each other, these grooves being engaged slidably by the forks of a pair of yoke members which are mounted on stub shafts or flanges, required to be universally jointed. Joints of this character have heretofore been proposed in which the ball member is formed at two positions where grooves intersect with a pair of flats in the bottom of the grooves for the purpose of enabling the tip ends of the forks of the yoke to be passed into position in the grooves of the ball when the joint is being assembled, the said flat portions being disposed in mutually parallel planes, both lying at right angles to the general planes of the grooves.

With this arrangement the ball member can readily be engaged by the forked members. This type of assembly has been found to be disadvantageous as it necessitates certain weakness in the design as there is no continuous sliding contact between the engaging members of the yokes and the circumferential grooves.

A further weakness is the fact that with all designs of this character there is nothing to prevent the joint from pulling apart in certain angular positions should longitudinal strain be placed on the joint.

The object of this invention is to provide a universal joint wherein the yoke members have a continuous circumferential contact with the bottom of the grooves in the ball, in every angular position of the yokes.

A further object is to provide a universal joint that cannot come apart after assembly until it is properly released for knock down for inspection of the moving parts.

As a further object, the invention sets out to provide an improved construction, robust in character and capable of transmitting a heavy torsional load for its size, especially heavy at moment of starting under load.

The foregoing and other features of my invention will now be described in connection with the accompanying drawing forming part of this specification in which I have represented my universal joint in its preferred form, after which I shall point out in the claims those features which I believe to be new and of my own invention.

In the drawings:

Figure 1 is an assembly view of a universal joint, embodying my improvements, in part section.

Figure 2 is a side view of a flange yoke which I may employ.

Figure 3 is a side view of a stub yoke which I employ shown at right angles to that shown in the assembly, Fig. 1.

Figure 4 is a central section of the ball unit employed showing the location of the circumferential grooves at right angles to each other, with the segmental portions removed from the grooves, said grooves having a substantially rectangular cross-section.

Figure 5 is a section similar to that shown in Figure 4, showing the countersink and hole adapted to receive a locking pin to hold the segmental pieces in place in the grooves after complete assembly.

Figure 6 is the locking pin employed.

Figure 7 is a detail of one pair of segmental sections showing the telescopic stud portions.

Figure 8 is a detail of the second pair of segmental sections showing the telescopic portions which are designed to pass through the hole in the first pair of studs shown in Figure 7.

Figure 9 is a side view of the segmental section at right angles to that shown in Figure 7.

Figure 10 is a side view of the segmental section, similar to that shown in Figure 8 only taken at right angles to that figure.

My universal joint comprises a pair of forked members 11 and 12 which are connected together operatively by a ball member 13 interposed there-between. The forked member 11, as herein illustrated takes the form of a flanged yoke, the flange portion 21 being set a right angles to the forks 11 of the yoke. The forks are each substantially semi-circular in shape providing a circular surface 22 through which the driving effort is transmitted to the ball 13. The stub yoke 12 has a similar circular contact surface 24. Both yokes are provided with notches 26—27 to permit free movement of the forked portions of the opposing yoke to freely pass therethrough. In the flange yoke I provide a hole 25 extending through the flange, through which the locking pin 28 may be passed to lock the parts together when positioned in countersink 81 within the ball provided to receive the pin 28.

The ball portion 30 of the joint is substantially a complete sphere having two circumferential grooves 31—32 of substantially rectangular cross-section which extends around the ball at right angles to one another.

The groove 31 is engaged by the forked portions of the flange yoke 11 and the groove 32 is engaged by the forked portions of the stub shaft yoke 12. Holes 109 and 110 are provided extending through diameter of the ball and spaced at right angles to each other and provided to receive the telescopic portions of the segmental fillers 51.

The grooves are each provided with a pair of flats 34 in the bottom of each groove spaced away from the outer section of the grooves. These flats are parallel to each other and spaced apart to permit the tip ends of the forked members 11 and 12 to pass without any interference, into position in their respective grooves.

It will be noticed that the segmental portions of the grooves thus removed are duplicated in shape and size by the heads 51 of the locking members shown in detail in Figures 7, 8, 9 and 10.

These four segmental heads 51 when assembled in position in the ball complete the continuous circumferential grooves 31 and 32 so that the yokes 11 and 12 have continuous contact around the entire surface of the groove regardless of angularity of the joint.

It will be noticed that the stud portions of the pair of segmental heads 51 shown in Figures 7 and 9 are provided with portions 61 and 62 which telescope and a through hole 63 is provided of size to accommodate the stud portions 66 and 67 of the segmental heads shown in Figures 8 and 10. The studs of the four heads are provided with holes 70 which are brought in line when these parts are completely assembled in the joint so that the shaft 71 of the locking pin 28 may enter all of the four holes, thus securely holding the heads 51 in place in their respective grooves.

In Figure 5, I show the screwed countersink 81 and hole 82 to accommodate the pin 71. This pin 28 is put in place by inserting it through the hole 25 in the flange yoke, and secured home.

To assemble my joint, place the ball 13 with the locking pin hole 81 positioned toward the flange portion of the yoke in position in the flange yoke 11, the forked members riding in groove 31. Turn ball with forks riding in the groove 31, 90° and insert one of the segmental pieces 51 shown in Figures 7 and 9. Turn ball with forks in groove 180° from last position and insert the companion piece 51. This completes the circumferential bottom of the groove 31 and being continuous the yoke 11 and ball 13 cannot separate while in any angular position, at the same time permitting free movement of the fork within the groove and uniform contact between the fork and groove in every angle.

To install the stub yoke 12, turn ball from its last position 90° so that the groove 32 is in a position substantially perpendicular to the flange 21 and insert stub yoke 12 so that the forks of the yoke ride in groove 32; turn yoke 90° with the forked members riding in the groove and insert one of the segments 51 shown in Figures 8 and 10; now turn yoke 180° from last position and insert companion piece 51; turn yoke so that the center line of the stub 12 is perpendicular to the flange 21 and the assembly is in position for locking with the pin 28 which is provided for the purpose. This pin is inserted in 80—81 of the ball by passing it through the hole 25 in the flange. The pin 28 is provided with an extension 71 which passes through the holes 70 in the telescopic extensions of the segmental pieces 51. While I have shown the locking pin to have a screw threaded head adapted to be received in the countersink 81 of the ball, and having an extension of smaller diameter designed to pass through holes 70 in each of the four segmental pieces, I do not wish to be limited by this construction as any means of holding the segmental pieces in position may be used as will be readily understood.

I wish it distinctly understood that my improved universal joint herein illustrated and described is in the form in which I desire to construct it and that changes or variations may be made as may be convenient or desirable without departing from the salient features of my invention and I therefore intend the following claims to cover such modifications as naturally fall within the lines of invention.

I claim:

1. A universal joint comprising a pair of forked members, to and from which respectively, the drive is taken, a ball member formed with a pair of circumferential grooves at right angles to each other, the forked members arranged to embrace the ball member and slide in the grooves for universal movement, the bottom of the grooves formed with flattened portions so the tip ends of the forked members may pass and permit assembly in the grooves, segments secured on the flattened portions to provide a continuous groove of constant cross section, studs projecting from the segments engaging each other in the center of the ball and means holding the assembly together comprising a pin passing through all of the studs and screwing into the ball.

2. A universal joint comprising a pair of forked members, a ball interposed between the forked members to transmit the drive from one fork to the other, said ball provided with two annular grooves substantially rectangular in cross section of equal cross section throughout, concentric with the ball and arranged at right angles to each other, the forked members also being rectangular in cross section and arranged to be received and to slide in the grooves, portions of the base of the grooves removable, providing means for assembly of said pieces and said removable portions when replaced secured to the base of the groove, means holding the assembly together comprising a pin passing through the removable portions and screwed into the ball whereby the assembly cannot come apart through longitudinal pull in any relative angular position of the two forked members.

3. A universal joint comprising a pair of forked members, to and from which, respectively, the drive is taken, a ball member formed with a pair of circumferential grooves at right angles to each other, the forked members arranged to embrace the ball member and slide in the grooves for universal movement, the bottom of the grooves formed with flattened portions so the tip ends of the forked member may pass and permit assembly in the grooves, segments secured to the flattened portion of the groove to provide a continuous groove of constant cross section, telescoping studs projecting from the diametrically opposed segments provided with aligning openings to receive the securing means, a pin passing through the studs and screwed into the ball.

IRVING MOORE.

REFERENCES CITED

The following references are of record in the file of this patent:

UNITED STATES PATENTS

| Number | Name | Date |
| --- | --- | --- |
| 478,811 | Ochring | July 12, 1892 |
| 1,314,320 | Fox | Aug. 26, 1919 |
| 1,381,214 | Mohr | June 14, 1921 |
| 2,254,972 | Mollart et al. | Sept. 2, 1941 |
| 2,402,006 | Anderson | June 11, 1946 |